UNITED STATES PATENT OFFICE.

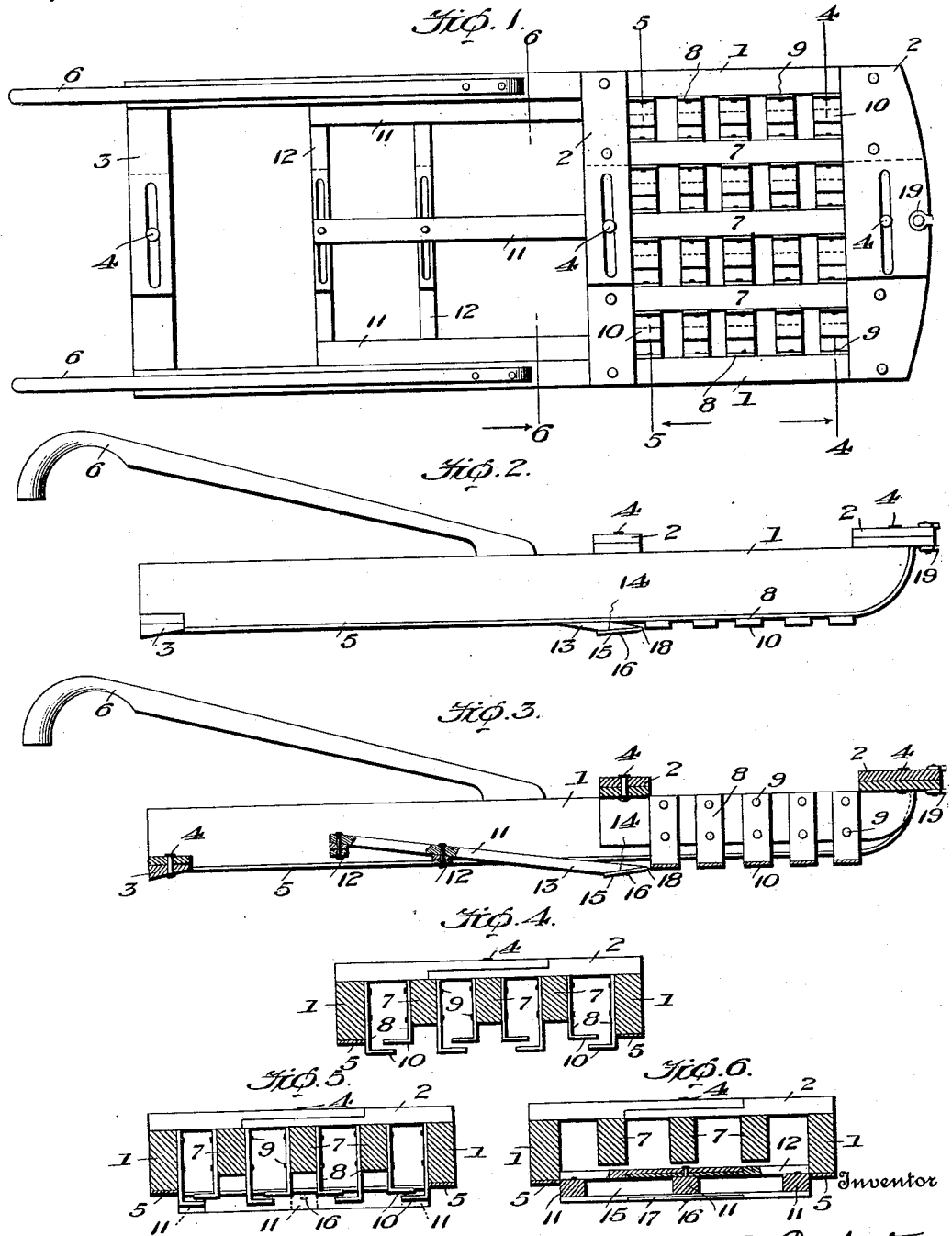

CHAUNCEY C. CARPENTER, OF CONCONULLY, WASHINGTON.

CULTIVATOR.

1,130,887.

Specification of Letters Patent. Patented Mar. 9, 1915.

Application filed May 9, 1914. Serial No. 837,431.

*To all whom it may concern:*

Be it known that I, CHAUNCEY C. CARPENTER, a citizen of the United States, residing at Conconully, county of Okanogan, and State of Washington, have invented certain new and useful Improvements in Cultivators, of which the following is a specification.

This invention relates to cultivators. My object is to provide a cultivator adapted to travel on ground runners, which will be provided with a novel arrangement and combination of sub-soil cutters, knife or plow, screen, and mulcher and smoother, by which any crop may be cultivated and the loosened earth crushed and left with a dust mulch on top.

I carry out my invention by the provision of a frame having ground runners, and adapted for lateral adjustment to suit any width of row, provide cultivator bars having sub-soil cutters depending therefrom; a horizontal knife, a screen located in the rear of the cultivating devices aforesaid and over which the slice of earth passes and through which it falls, and mulching means for forming a top dust mulch adapted to retain moisture and thus facilitate the growth of the crop.

One embodiment of the invention is fully set forth hereinafter and disclosed in the accompanying drawings, in which—

Figure 1 is a plan view; Fig. 2, a side elevation; Fig. 3, a longitudinal section; and Figs. 4, 5 and 6, cross sections on the lines 4—4, 5—5 and 6—6, respectively.

The frame is composed of side bars or runners 1 which are connected by upper cross bars 2 and a rear smoother and mulcher 3. The bars 2 and 3 may have slot-and-bolt adjustable connections 4, whereby the side-pieces 1 may be moved nearer or farther apart according to the row which is being cultivated. The side bars 1 serve as runners and are preferably provided with steel running or facing strips 5. The handles 6 are conveniently arranged so that the person guiding the cultivator may walk along in the rear thereof.

The cultivator bars 7 are secured to the cross bars 2, preferably at regular intervals. When the frame members 1 are moved toward or away from each other, a lesser or greater number of the cultivator bars 7 will be used. The cutters 8 are secured by a pair of bolts 9 to the bars 7 and they are of L-shape, their lower horizontal cutting parts 10 being arranged so that they are below the lower edges of the bars or runners 1 and, consequently, adapted to penetrate the soil to cut horizontally below the surface thereof, a top slice or layer of the earth. The cutters 8 are arranged in series on each bar 7 which series are oppositely disposed to those of an adjoining bar and may be oppositely arranged to others of the same bar.

The lower face of the mulcher bar 3 inclines rearwardly and downwardly below the lower edges of the side bars 1 so that this bar serves to smooth the cut and crushed soil and to form it into a top dust mulch adapted to retain moisture.

The screen is composed of longitudinally extending steel bars 11 which terminate at their rear ends short of the mulcher bar 3 and are supported by lower crushing and mulching steel cross bars 12 connected to the runners 1. The bars 11 incline downwardly as they extend forwardly. A horizontal knife 15 is secured to the beveled ends 14 of bars 11 by suitable fastenings 16 and this knife may be in sections connected by an adjustable connection 17 to permit widening of the cultivator. The forward edge 18 of the knife is in substantially the same plane as the lower faces of the cutting parts 10 so that it is adapted to run under the slice of earth turned by the horizontal cutting parts 10 and to pick up the slice and direct it to the tops of the screen bars 11.

The team is connected to the bar 2 by any suitable clevis 19.

As the cultivator is drawn along by the team, the parts 10 of the cultivating knives travel horizontally below the upper surface of the soil, cutting a slice of earth and making it impossible for any weeds to escape. The loosened slice of earth is then directed by the sharpened edge of the knife 15 onto the screen bars 11. The screen stirs and breaks up the slice of earth and brings to the surface the coarser portions of the soil to enable the mulching bars 12 and 3 to act more effectively in reducing the entire surface to a proper mulch. The bars 12 crush and mulch such portion of the soil as falls through the screen in front of them. The coarser portion of the slice of soil passes off of the upper rear end of the screen 11 and falls in front of the crushing and mulching bar 3 which completes the work of crushing, mulching and smoothing the surface, leaving it in the best possible condition to retain moisture. The lower face of the mulch bar 3 being rearwardly and downwardly inclined, is adapted to exert a combined pressing and smoothing operation to effect the foregoing result.

Having thus described my invention, what I claim as new and desire to secure by Letters Patent, is:

1. In a cultivator, the combination with a frame, of soil cutters carried thereby, an inclined screen over and through which the loosened soil is adapted to travel, the screen being located in the rear of the cutters, and a mulcher adapted to act on the earth.

2. In a cultivator, the combination with a frame, of soil cutters carried thereby, an inclined screen over and through which the loosened soil is adapted to travel, the screen being located in the rear of the cutters, and a mulch bar having an inclined face and located in the rear of the screen and adapted to act on the earth treated by said screen.

3. In a cultivator, the combination with a frame, of soil cutters, a horizontal knife located in the rear of the cutters and adapted to raise the slice of earth cut by the cutters, an inclined open screen over and through which the soil is adapted to pass, and a mulcher adapted to treat the soil which passes through the screen.

4. In a cultivator, the combination with a frame, of soil cutters carried thereby, an inclined screen composed of longitudinal and crushing and mulching cross bars located in the rear of said cutters, a horizontal knife located in advance of the screen in position to raise the slice of earth cut by the cutters and direct it to said screen, and a mulch bar located in the rear of the screen and adapted to mulch the soil which passes from said screen.

5. In a cultivator, the combination with a frame, of depending cutters having horizontal knives, a screen having inclined and lower transverse crushing and mulching bars and located in the rear of the cutters, a horizontally arranged knife at the front of the screen, and a mulch bar at the rear of the screen.

In testimony whereof, I hereunto affix my signature in presence of two witnesses.

CHAUNCEY CARPENTER.

Witnesses:
ARTHUR C. EGBERT,
WM. BAINES.